Jan. 5, 1937. A. MUSSO 2,066,358
GAS PRESSURE MAINTAINING DEVICE
Filed Oct. 31, 1934
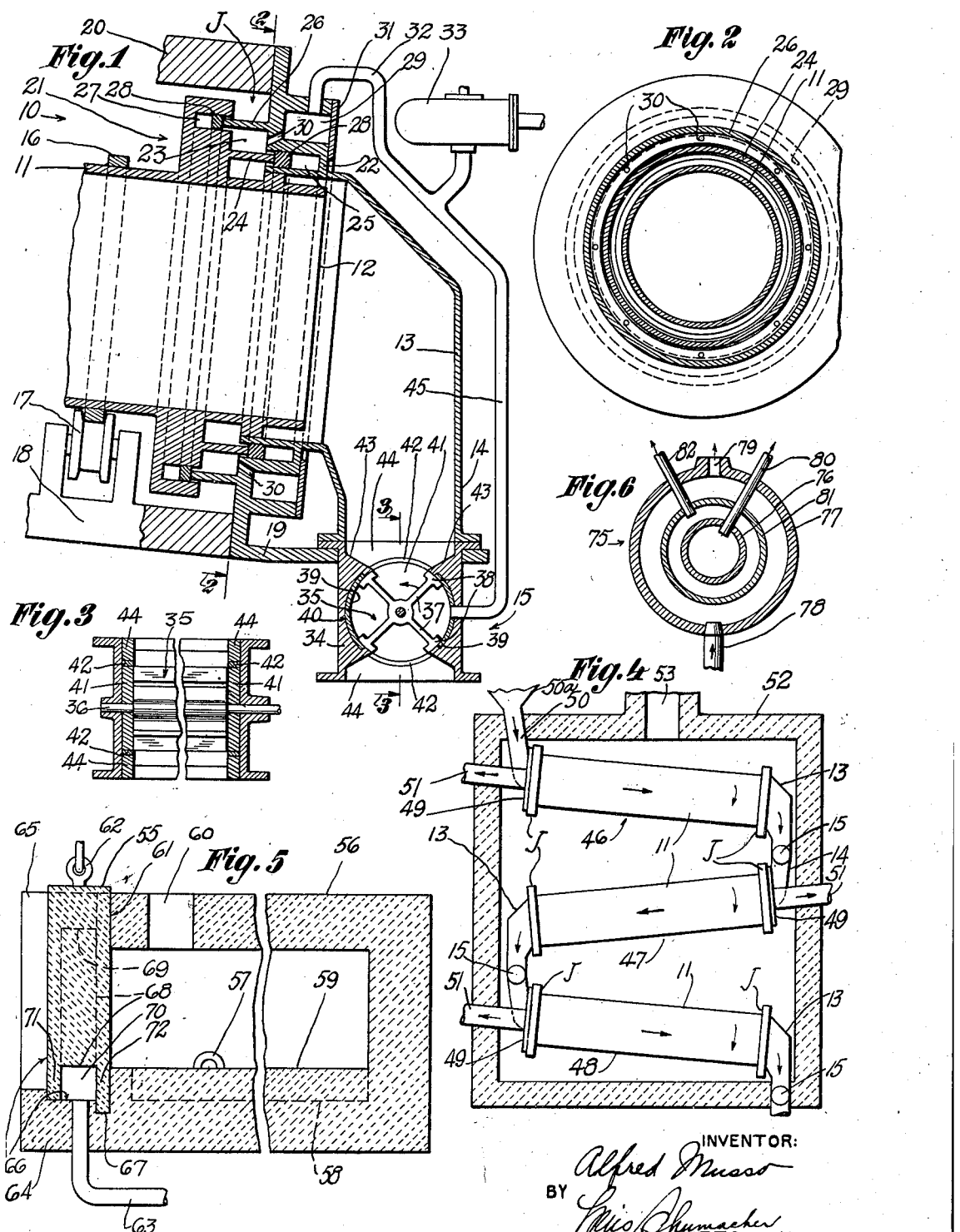
INVENTOR:
Alfred Musso
BY
ATTORNEY Patented Jan. 5, 1937

2,066,358

UNITED STATES PATENT OFFICE 2,066,358

GAS PRESSURE MAINTAINING DEVICE

Alfred Musso, East Orange, N. J., assignor of one-half to William P. Deppe, New York, N. Y.

Application October 31, 1934, Serial No. 750,798

13 Claims. (Cl. 263—32)

This invention relates to fluid pressure maintaining or controlling devices with particular reference to devices subject to leakage of the fluid either by reason of the construction thereof or of the materials of which such devices are composed; and to methods of regulating or controlling such leakage.

One object of the invention is to provide a device including a chamber for a fluid therein under a pressure different from that of a fluid outside of the chamber, and improved means for controlling or preventing leakage of one of said fluids with respect to said chamber.

Another object of the invention is the provision of a device having a chamber provided with relatively movable walls, and an improved joint between said walls for preventing or regulating leakage that would otherwise occur from or into said chamber through a slide or slip portion of the joint.

Another object of the invention is the provision of a device having an improved slide joint operative between parts of a heating apparatus, so as to avoid the necessity of using expensive constructions, fluidtight arrangements, or materials and structures which deteriorate when subjected to heat.

Another object of the invention is to furnish a device having relatively few and simple parts, and which is comparatively inexpensive to manufacture and assemble, durable, reliable and efficient in use.

A further object of the invention is to provide a novel and simple method of controlling or preventing leakage without depending upon a fluidtight structure for the accomplishment of this purpose.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a fragmentary vertical sectional view showing a device embodying the invention.

Figs. 2 and 3 are sectional views taken on lines 2—2 and 3—3 of Fig. 1.

Fig. 4 is a diagrammatic sectional view of a multi-stage apparatus embodying the invention.

Fig. 5 is a fragmentary vertical sectional view of a modification of the invention.

Fig. 6 is a vertical sectional view of a further modification of the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, this invention provides a means and method for preventing or controlling leakage of fluid relative to a chamber wherein a desired pressure is required, where the wall of such chamber possesses the capacity of permitting a flow or leakage of fluid therethrough under certain differential pressures, and particularly where commingling of the fluids that are inside and outside of the chamber is not desired, the required results being effected by a change in the pressure condition of the fluid that is, for example, outside of and in contact with said wall so that a pressure differential can be maintained to control or wholly prevent said leakage. Differently stated, and using an illustrative example, if it be desired to maintain a reduced pressure or vacuum within the chamber mentioned and to prevent leakage thereinto of gases outside of the chamber, the pressure of the external gases may be reduced to equal or to be slightly less than the internal pressure of the chamber, whereby leakage through the wall will be wholly prevented or caused to occur, if at all, outward, whereby at once to assure maintenance of the low pressure in the chamber and to effectively prevent the outside gases from contaminating the chamber contents. These desirable results can be obtained in conventional structures made of ordinary materials, and are applicable to wholly stationary devices as well as to devices having chambers provided with relatively movable parts. More particularly, the invention is of advantage where embodied in apparatus for use under heated conditions; for instance, where a chamber must be provided with a joint that cannot for practical reasons be made gas tight, or where such chamber is furnished with a relatively porous refractory wall. It will be understood that the invention is also applicable to chambers where a pressure is to be maintained above that which would normally prevail outside of the chamber, and that the terms internal and external are to be understood in the relative sense.

Specifically, the invention provides one or more chambers having a wall having relatively movable parts, and a slip or slide joint therebetween, located internally or externally of the chambers, and pump means communicating with the space within the joint independently of said chamber to maintain a gas pressure in the joint so as to prevent or control leakage or flow of gases into the joint through the slide portion thereof. The joint may have a compartment therein extending along the joint to facilitate the accomplishment of this object. Hence it is unnecessary to construct a leakproof slide joint between the relatively movable parts of the chamber or chambers, where such joint may be too expensive, or structurally incapable of making up sufficiently tight, or where such joint may be affected or deteriorated by heat or by materials contacting the same. The joint provided by this invention is of general application to apparatus operating at all temperatures and with all manner of fluids.

Referring in detail to the drawing, 10 denotes a device embodying the invention. A reduced pressure or vacuum retort may include a cylindrical rotary drum 11 having an open end at 12 and a stationary end closure wall 13 having a duct 14 leading downward to a means or valve 15 whereby the discharge of material from the retort may be controlled without admitting external gases or air into the retort. Desirably the drum 11 is downwardly inclined and may have an annular rail 16 engaging angularly spaced rollers 17 operatively mounted on a support 18 to which may be rigidly secured a frame portion 19 for carrying the end wall 13 and valve means 15. The retort may be internally or externally heated electrically or by means of fuel, and is preferably externally gas fired within a suitable furnace chamber 20. The drum may be rotated in a well known manner, and gases may be exhausted therefrom by any suitable means. Further details may be obtained by referring to my Patent No. 1,841,625, issued January 19th, 1932, and my Patent No. 1,841,626, issued January 19th, 1932, over which patents the present device may be regarded as an improvement.

A joint J may include elements 21, 22 connected to the drum and closure wall, which elements provide for one or more relative movements as at angles to each other, so as to take up expansion and contraction of the drum, as well as to permit the rotation thereof. These elements may have slide or slip engagement as by means of interfitting radial flanges and grooves, extending along cylindrical surfaces coaxial with the drum 11 and preferably radially spaced from each other to provide an annular space or compartment 23 between the elements and their flanges. Thus the element 21 has a flange 24 extending into the groove 25 of the element 22 and the latter having the flange 26 extending into the groove 27 of the element 21. Secured to the flanges along their edges are the annular packing rings 28 which snugly fit their respective grooves. Associated with one of said elements, preferably with the element 22, is an annular duct 29 that may communicate with the compartment 23 through a series of openings 30. Said duct may be closed by a plate 31 and a conduit 32 may communicate the duct with an exhaust pump 33.

The means 15 may include a valve casing 34 having therein a star shaped valve 35 mounted on a shaft 36 extending in a generally horizontal direction. The said casing may have its opposed sides of arcuate form for adequate engagement by the vanes 37 of the valve, the free edges whereof are longitudinally flanged as shown at 38 for extended contact with the packing 39, that is set into the recesses 40 of the valve casing. Said packing may be in the form of cylindrical sections and may extend the entire length of the valve. Interconnecting the vanes at the ends of the valve are discs 41. To prevent leakage between the casing and the discs, arcuate packing strips 42 may be placed above and below the same, so as to extend between the shoulders or guide portions 43 of the casing, and retained in place by plates 44 secured to the valve casing in any suitable manner. The packing used at 39, 42 and 28 may be of like character, and may consist, for example, of aluminum or of antimony-copper alloy braided cords which may be secured or braided together to form, for instance, a fabric or mat. The cords are constructed in a well known manner by rolling the metal very thin and folding, twisting or crumpling the same to furnish a pliable, yielding cord, whose frictional resistance is low and which will not jam with the valve where fine pulverulent material is passed through the valve. Considering that the direction of rotation of the valve is indicated by the arrow, a conduit 45 connects an upward moving chamber formed between the casing 34 and a pair of adjoining vanes 37, and an exhaust pump such as pump 33.

The operation of the device 10 will now be briefly described. Assume that the heated rotating drum 11 contains materials that are being treated and continuously discharged at the lower end of the retort while other materials are being fed into the retort at the upper end thereof, and that such treatment occurs under a subatmospheric pressure in the retort and in presence of certain gases present or evolving in the retort; and further that it is not desired that such gases shall mix with air or products of combustion or other gases which might leak into the retort through a slide or slip joint between the relatively movable walls thereof, nor that such leakage shall occur with its possible ill effects upon the materials being treated, nor to increase the low pressure which it is desired to maintain in the retort. While a correspondingly low pressure might be maintained in the chamber 20, this is ordinarily impractical where combustion must occur therein, and because of the virtual impossibility of making the setting gas tight. By this invention the pump 33 communicates with the internal or slide surface region of the slip joint or the clearance therein, exemplified, for instance, by the compartment 23, so as to maintain a pressure therein at a required ratio to the retort pressure to balance the latter, or to be slightly less than the latter, or to be somewhat greater if a predetermined moderate flow into the retort should be desired. Since the pump communication with the joint is independent of the chamber or retort, the pump need not extract gases out of the retort itself. Further the tongue and groove arrangement of the joint, which is desirably used, offers considerable mechanical obstruction against leakage of the gases, especially in conjunction with the packing 28. No solid particles from the retort can enter and effect the joint. If the retort expands, the relative rotary motion between the drum and stationary closure wall is accompanied by a relative axial motion therebetween. Rotation of the valve 35 may occur intermittently and each successive upward moving chamber between the vanes 32 thereof becomes evacuated through 45 before coming into communication with the duct 14, so that undesired gases may not enter the retort.

In Fig. 4 is shown a device embodying the invention disclosed in Figs. 1 to 3, as applied to a multi-stage apparatus, of the type that is suitable, for example, for use in the practice of the process described in my Patent No. 1,902,090, issued March 21st, 1933. Thus a plurality or series of retorts 46, 47, 48 are disposed at different elevations, and preferably with their axes lying in a vertical plane, but successively downwardly inclined in opposite directions. The retorts may be substantial duplicates of each other, each having a rotary drum 11 and a closure wall 13 at the lowermost end thereof. The upper ends of the drums may have any suitable closure walls 49, and the joints J interengage the rotary drums with the corresponding stationary end closure walls. A conduit 50 may extend from a hopper 50a through the closure wall 49 of the uppermost retort 46 to feed material thereinto, and an exhaust conduit 51 may extend into this retort through said closure wall 49, connected to a pump, not shown, for removing gases from the retort 46, in counterflow to the solid charge in the retort. The materials discharged from retort 46 under control of the valve means 15 pass into the upper end of the retort 47 through the duct 14 which communicates with this retort through its closure wall 49. Also extending through the latter is the exhaust pipe 51 leading to an exhaust pump for evacuating gases from the retort 47. Similar connections and arrangements are provided for and between the retorts 47 and 48. The entire series of retorts may be housed in a suitable heating chamber 52, which may have burners and heat distributing means of the type shown and described in the patents hereinbefore referred to, and products of combustion may be discharged through the flue 53. Within this chamber 52, the retorts and coacting parts may be operatively mounted in any suitable manner, for instance, as suggested in Fig. 4, or in said patents.

The operation of the device shown in Fig. 4 will now be briefly described. The retorts 46, 47 and 48 may be maintained at successively increasing temperature, for the reduction of an ore in stages according to the process described in my Patent No. 1,902,090, issued March 21st, 1933. The charge passes continuously through the successive retorts in a downward direction, and the gas pressures being successively diminished for the successive retorts 46, 47, and 48. Thus different gases are evolved and produced in the different retorts and are separately withdrawn therefrom for use as desired. Air and products of combustion are prevented by the joints J from leaking into the retorts, so that secondary and reversible reactions are avoided, and an accelerated complete reduction of an ore produced at relatively low temperatures.

In Fig. 5 is shown a modification of the invention wherein the principle of the joint is applied at the door 55 of a conventional furnace 56 of the annealing type. Such a furnace may be gas fired by burners 57, the flames impinging in longitudinal troughs 58 at opposite sides of a hearth 59, and the products of combustion passing out through the flue 60 which is designed to maintain a slight pressure in the furnace to prevent leakage of air thereinto around the door. In fact, the flue is placed near the door to minimize such leakage. Nevertheless, leakage of air does occur, especially when the furnace is operated at a low portion of its temperature range, and hence oxidation occurs of materials that are being heat treated. By my invention, the otherwise conventional vertically movable door, that slides against the front face 61 of the furnace chamber, and is elevated and lowered by a connection as at 62, has improved coaction so that gases are directly exhausted along its slide surfaces, as by a pipe 63 leading to any exhaust pump. Thus the floor of the furnace may have a forward extension 64 below the level of the hearth, and similar offset side wall extensions 65, so that the door has continuous sliding contact along the plane 61 at the top, bottom, and sides of the furnace chamber. The extensions 64, 65 may have a continuous recess or groove 66 in which the side and bottom edge portions of the door are slidably fitted. A secondary groove 67 may extend continuously within and along the groove 66 to the top of the furnace. The door 55 may have a continuous groove or recess 68 along the bottom and sides thereof but terminating at 69 in spaced relation to the top of the door, to provide a compartment 70 close ended at 69. This compartment is thus located between the door and the adjacent furnace chamber wall, and between the edge flanges 71, 72 of the door, which, by fitting into the grooves 66 and 67 afford considerable resistance to the flow of gases. The means 63 maintains a reduced pressure in the compartment 70, so as to prevent leakage into the furnace chamber around the door by convection, and if desired, a slight leakage of gases outward from the furnace chamber into the compartment 70 may be maintained. Even when the door is opened, the exhaustion means 63 will tend to cause a flow of furnace gases toward the front of the furnace to minimize the flow of air into the furnace.

In Fig. 6 is shown a further modification of the invention, including a device 75 which may be in the nature of a muffle furnace, having an inner heating chamber 76, and an outer chamber 77 provided with a burner 78 and a flue 79. A partial vacuum may be maintained in the inner chamber by a pipe 80 connected to a pump. To prevent leakage of products of combustion from the outer into the inner chamber through the leaky or relatively porous wall of the latter, I provide an intermediate chamber 81 independently exhausted by a means 82. Allowing for resistance to leakage, the pressure in the intermediate chamber may be somewhere between the pressures of the inner and outer chambers, although it may also be equal to or less than the pressure of the inner chamber. Hence leakage may be prevented or may occur only from the outer to the intermediate chamber, so that the muffle atmosphere can be absolutely controlled without relying upon the uncertainties of tightness of a furnace wall. The chambers may be supported in stationary relation relative to each other in any suitable manner.

By the terms pump and pumping means as used herein is meant any means or device employed directly or indirectly to cause a flow of gas or a change in the pressure of a gas.

I claim:

1. A device including a reducing heating chamber adapted to maintain a gaseous pressure therein different than that of the gaseous pressure outside of said chamber, an exhaust pump connected to the chamber for evacuation of gases generated in said chamber, said chamber having a plurality of walls at least one of which is movable relatively to the other, and a joint for interengaging said walls, said joint including elements connected to the different walls, said elements having slidable interengagement along a plurality of spaced lines extending longitudinally of the joint to provide an annular compartment between said lines, and pump means for maintaining a required gaseous pressure in said compartment relatively independent of the pressure in said chamber to control the flow of gases into the joint.

2. A device including a chamber adapted to maintain a required gaseous pressure therein, said chamber having a plurality of walls movable in rotatable and axial paths relative to each other, and a joint between said walls including elements on the different walls having interfitting slidable engagement with each other along a plurality of spaced surfaces to cause the elements to provide an otherwise closed compartment, said surfaces lying along the said paths of movement so that the joint permits the relative motions between said walls to occur, and means communicating with said compartment independently of said chamber to maintain a required gaseous pressure in the compartment, whereby a flow of gases betwen the latter and the chamber along the joint can be controlled.

3. A device including a reduced gas pressure cylindrical rotary retort drum having an open end, a relatively stationary wall for said open end, and an annular joint between said drum and said wall, said joint including elements connected respectively to said drum and said wall, said elements having interfitting flange and groove engagement with each other along a plurality of radially spaced cylindrical surfaces coaxial with said drum, said flanges being adapted for rotary and axial sliding movement in said grooves to permit rotation of the drum and to accommodate the latter for changes in length due to expansion and contraction of the drum, said elements and said flanges defining a substantially annular compartment therebetween, said compartment being closed except for leakage communication with the retort and the atmosphere outside thereof along the slide engagement surfaces, and a pump means communicating with said compartment independently of the interior of the retort to maintain a pressure in said compartment such so as to prevent leakage of said atmosphere into the retort.

4. A device including a reduced gas pressure retort having a cylindrical rotary drum having an open end, and a relatively stationary wall for said open end, said drum and said wall having annular portions external of the retort, said portions having interfitting flange and groove engagement with each other along a plurality of cylindrical radially spaced surfaces coaxial with said drum, said flanges having annular packing means engaged therewith for rotary and axial sliding engagement with the side walls of said grooves, said portions and said flanges defining a compartment therebetween, a pump means communicating with said compartment to maintain a gaseous pressure therein, and said compartment being otherwise substantially closed, whereby leakage of gases into the retort through the compartment from the region exterior to said retort is prevented.

5. A device including a plurality of retorts disposed at different elevations and inclined in different directions so that an upper retort is adapted to discharge its contents into a lower retort, said retorts including rotary drums to agitate their contents and to cause a continuous flow thereof downward through the successive retorts, said retorts having relatively stationary end closure walls for said drums, and means interconnecting the closure wall at the lower end of one retort with the closure wall at the upper end of a lower retort to permit said continuous flow of the retort contents, means for separately evacuating the gases of the different retorts, and rotatable valve means in the interconnecting means to cause said continuous flow of the retort contents and to prevent a flow of gases between said retorts.

6. A device including a plurality of retorts disposed at different elevations and inclined in different directions so that an upper retort is adapted to discharge its contents into a lower retort, said retorts including rotary drums to agitate their contents and to cause a continuous flow thereof downward through the successive retorts, said retorts having relatively stationary end closure walls for said drums, and means interconnecting the closure wall at the lower end of one retort with the closure wall at the upper end of a lower retort to permit said flow of the retort contents, means for separately evacuating the gases of the different retorts and valve means in the interconnecting means to control said flow of the retort contents and to prevent a flow of gases between said retorts, said valve means having a star shaped rotor rotatable about a generally horizontal axis, said retorts including joints between the drums and their corresponding end walls, means to directly control gaseous pressure within said slip joints and to evacuate gases from upward moving chambers formed by said rotors in course of their rotation, and means to feed material into, and to control the discharge of material from, the respective upper end of the uppermost retort and the lower end of the lowermost retort without admitting external gases into the corresponding retorts.

7. A device including an inclined reduced pressure retort having a rotary drum and stationary end walls therefor, slip joints between said drum and said end walls, means connected to said end walls for feeding a material into the retort at an upper end thereof and for discharging the material from the retort at the lower end thereof, said means having star shaped valves for the different ends of the retort, said valves being rotatable about generally horizontal axes, casings for the valves, and exhausting pump means communicating with the clearance spaces in said slip joints and with the upward moving closed chambers formed between a wall of each casing and a pair of vanes of each valve.

8. A reduced gas pressure device including a chamber having a plurality of sections rotatably movable relatively to each other, said sections having an annular slip joint therebetween, said joint having axially alined parts adapted for relative circular and axial movement and having a relatively closed space therebetween, and means communicating with said space independently of said chamber for maintaining a required gas pressure in said space, as set forth.

9. A device including a chamber having a plurality of sections rotatably movable relatively to each other, said sections having an annular slip joint therebetween, said slip joint having axially alined parts coacting with each other and with said sections to permit relative circular and axial movement of the sections, said slip joint providing a relatively closed annular space relatively independent of said chamber for maintaining a required gaseous pressure in said slip joint, and means for causing a flow of gas with respect to said space and independently of the retort so that the required pressure condition is maintained in said space relative to pressure in the chamber.

10. A device including a chamber adapted to maintain a required pressure condition therein, said chamber having a plurality of coaxial walls rotatable relative to each other, and a slip joint between said walls having means providing a plurality of radially spaced annular grooves and flanges coaxial with said walls, said flanges rotatably fitting in said grooves to provide a multi-slip joint seal between the chamber and the outside atmosphere at the joint.

11. A device including a chamber adapted to maintain a required pressure condition therein, said chamber having a plurality of coaxial walls rotatable relative to each other, and a slip joint between said walls having means providing a plurality of radially spaced annular grooves and flanges coaxial with said walls, said flanges rotatably fitting in said grooves to provide a multi-slip joint seal between the chamber and the outside atmosphere at the joint, said flanges providing a compartment therebetween, and means for maintaining a required gaseous pressure in said compartment substantially independently of the pressure maintained in the retort.

12. A device including a chamber adapted to maintain a required pressure condition therein, said chamber having a plurality of coaxial walls rotatable relative to each other, and a slip joint between said walls having means providing a plurality of radially spaced annular grooves and flanges coaxial with said walls, said flanges rotatably fitting in said grooves to provide a multi-slip joint seal between the chamber and the outside atmosphere at the joint, said flanges being both radially spaced from at least one of said walls, and the walls overlapping each other at said joint.

13. A device including a plurality of retorts disposed at different elevations and inclined in different directions so that an upper retort is adapted to discharge its contents into a lower retort, said retorts including rotary drums to agitate their contents and to cause a continuous flow thereof downward through the successive retorts, said retorts having relatively stationary end closure walls for said drums, and means interconnecting the closure wall at the lower end of one retort with the closure wall at the upper end of a lower retort to permit said continuous flow of the retort contents, means for separately evacuating the gases of the different retorts, and rotatable valve means in the interconnecting means to cause said continuous flow of the retort contents and to prevent a flow of gases between said retorts, said valve means having a rotor having a generally horizontal axis, said rotor having vanes providing compartments in the interconnecting means, and means for evacuating gases from the compartments in course of upward movement thereof upon rotation of said rotor.

ALFRED MUSSO.